(12) United States Patent
Iwamoto

(10) Patent No.: US 9,413,044 B2
(45) Date of Patent: Aug. 9, 2016

(54) BATTERY ASSEMBLY, UNIT CELL AND CUT-OFF DEVICE

(75) Inventor: Takashi Iwamoto, Chiba (JP)

(73) Assignee: Empire Technology Development LLC, Wilmington, DE (US)

( * ) Notice: Subject to any disclaimer, the term of this patent is extended or adjusted under 35 U.S.C. 154(b) by 916 days.

(21) Appl. No.: 13/641,288

(22) PCT Filed: Jun. 4, 2012

(86) PCT No.: PCT/JP2012/003661
§ 371 (c)(1),
(2), (4) Date: Oct. 15, 2012

(87) PCT Pub. No.: WO2013/183079
PCT Pub. Date: Dec. 12, 2013

(65) Prior Publication Data
US 2013/0323548 A1   Dec. 5, 2013

(51) Int. Cl.
*H01M 10/50* (2006.01)
*H01M 10/625* (2014.01)
*H01M 2/34* (2006.01)
*H01M 10/42* (2006.01)
*H01M 10/615* (2014.01)

(52) U.S. Cl.
CPC .......... *H01M 10/5016* (2013.01); *H01M 2/348* (2013.01); *H01M 10/4207* (2013.01); *H01M 10/615* (2015.04); *H01M 2200/103* (2013.01); *Y10T 307/724* (2015.04)

(58) Field of Classification Search
None
See application file for complete search history.

(56) References Cited

U.S. PATENT DOCUMENTS

| | | | |
|---|---|---|---|
| 5,712,610 A | 1/1998 | Takeichi et al. | |
| 5,939,217 A * | 8/1999 | Tamura | H01M 2/1241 429/53 |
| 2002/0051904 A1* | 5/2002 | Itoh | H01M 10/0413 429/149 |
| 2003/0064257 A1* | 4/2003 | Iwasaki | H01M 10/42 429/7 |
| 2003/0152830 A1* | 8/2003 | Eaves | H01M 10/425 429/156 |
| 2004/0166405 A1* | 8/2004 | Senda | H01H 37/761 429/127 |
| 2009/0058362 A1 | 3/2009 | Yun | |
| 2009/0111006 A1* | 4/2009 | Bruce | H01M 10/425 429/61 |

FOREIGN PATENT DOCUMENTS

| | | |
|---|---|---|
| JP | 2012-129124 A | 0/7201 |
| JP | 05-174678 | 7/1993 |

(Continued)

OTHER PUBLICATIONS

International Search Report and Written Opinion for PCT/JP2012/003661 dated Aug. 28, 2012.
Main Battery Disconnect Switches, http://www.sbsbattery.com/subpage_index.php?_subp_=158 (Printed from Internet Nov. 8, 2011).

(Continued)

*Primary Examiner* — Ula C Ruddock
*Assistant Examiner* — Matthew Van Oudenaren
(74) *Attorney, Agent, or Firm* — Pepper Hamilton LLP

(57) ABSTRACT

In an aspect, a battery assembly is adapted to accommodate a plurality of unit cells, the battery assembly has: a unit cell wiring configured to provide at least one connection for the unit cells; a cut-off device having a fuse circuit and a heater circuit, the fuse circuit configured to disconnect the connection by heat produced in the heater circuit; and a power supply wiring configured to supply the heater circuit of the cut-off device with an electric power.

20 Claims, 13 Drawing Sheets

(56) References Cited

FOREIGN PATENT DOCUMENTS

| | | |
|---|---|---|
| JP | 07-153367 | 6/1995 |
| JP | 10-241748 | 9/1998 |
| JP | 2001-126781 A | 5/2001 |
| JP | 2003-217416 A | 7/2003 |
| JP | 2004-355954 A | 12/2004 |
| JP | 2007-123129 A | 5/2007 |
| JP | 2008-288046 A | 11/2008 |
| JP | 2010-238405 A | 10/2010 |
| JP | 2011-124127 A | 6/2011 |

OTHER PUBLICATIONS

Thermal Cutoffs (TCO)/Thermal-links, http://industrial.panasonic.com/www-cgi/jvcr13pz.cgi?E+PZ+2+AFA0001+0+4+WW (Sep. 2010).

Common Combiner Questions and Answers, http://www.vandina.com/combInfo.htm (Printed from Internet Nov. 8, 2011).

Mitsubishi Motors, new-generation electric car "i-MiEV" to market delivery start—mainly in corporate and public sector than ~ 2009 late Jul., accessed at http://web.archive.org/web/20100106120111/http://www.mitsubishi-motors.co.jp/publish/mmc/pressrelease/news/detail1940.html, posted on Jun. 5, 2009, pp. 1-6.

* cited by examiner

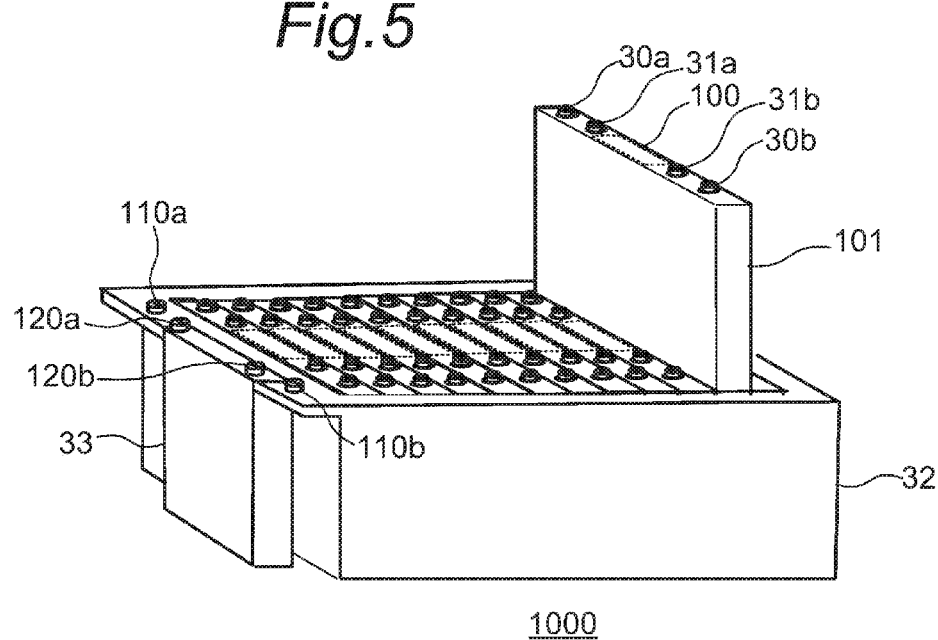
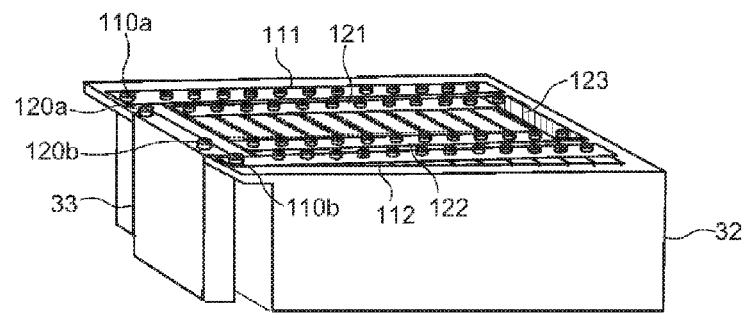

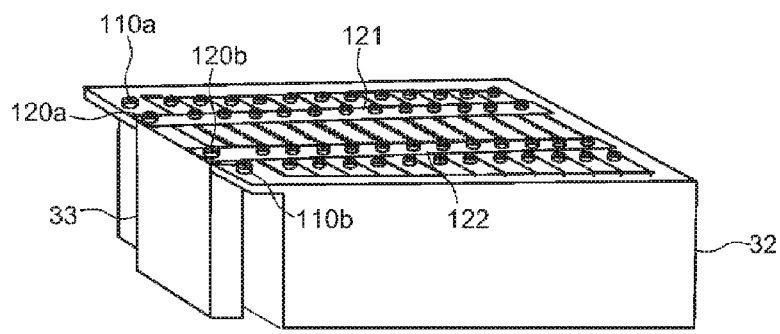

BATTERY ASSEMBLY, UNIT CELL AND CUT-OFF DEVICE

CROSS-REFERENCE TO RELATED APPLICATION

This application is a U.S. national stage filing under 35 U.S.C. §371 of International Application No. PCT/JP2012/003661, filed Jun. 4, 2012 and entitled "Battery Assembly, Unit Cell and Cut-Off Device," the disclosure of which is incorporated by reference in its entirety.

TECHNICAL FIELD

A battery assembly, unit cell and cut-off device, and more particularly, a useful configuration for a battery when used at the time of disposal is disclosed.

BACKGROUND

Using large-capacity battery systems has increasingly become an essential element in some technical fields. For instance, the automobile industry is experiencing a dramatic shift from the age of hybrid automobiles to the age of electric automobiles. Implementing such a large-capacity battery systems is the key element for bringing about a new age in automobiles. In such a large-capacity battery systems, a large number of battery cells are connected to one another to provide the desired amount of voltage and current.

As such battery systems combining a large number of battery cells come into widespread use, the lives of the battery cells will expire after some years and the battery systems will need to be disposed of or recycled.

When disassembling the battery systems, one or more of such battery cells have a non-negligible level of charge remaining. In the battery systems combining a large number of the battery cells, there may be cases where a considerable amount of energy remains. When an attempt is made to disassemble the coupled battery cells into single cells, if the cells have a certain amount of charge remaining, the balance of the entire battery system will be lost. This results in a phenomenon that a reverse current flows from some cells to cells that have become relatively weaker and have a relatively lower voltage than the other cells. This phenomenon may cause an undesirable consequence. No method of safely disassembling a battery system has been provided so far.

In view of these issues, there is a demand for a configuration and method of safely and readily electrically separating a battery assembly composed of used unit cells into single unit cells at the time of disassembly.

SUMMARY

In one aspect, a battery assembly adapted to accommodate a plurality of unit cells is provided, the battery assembly having:

a unit cell wiring configured to provide at least one connection for the unit cells;

a cut-off device having a fuse circuit and a heater circuit, the fuse circuit configured to disconnect the connection by heat produced in the heater circuit; and a power supply wiring configured to supply the heater circuit of the cut-off device with an electric power.

In another aspect, a unit cell is provided, having:

a unit cell body configured to provide an electric power; and a cut-off device being attached to the unit cell body, the cut-off device having a fuse circuit and a heater circuit, the fuse circuit configured to be disconnected by heat produced in the heater circuit.

In yet another aspect, a cut-off device is provided having:

a fuse circuit; and a heater circuit configured to produce heat, the fuse circuit being configured to be disconnected by the heat produced in the heater circuit.

BRIEF DESCRIPTION OF DRAWINGS

FIG. 5 schematically illustrates an oblique perspective view of a battery assembly in the present embodiment.

FIG. 6A schematically illustrates an oblique perspective view of a battery assembly in normal use in the present embodiment.

FIG. 6B schematically illustrates an oblique perspective view of a battery assembly when disassembling in the present embodiment.

FIG. 8 illustrates a circuit diagram of a battery assembly in the present embodiment showing positions where a cut-off device can be applied to.

DETAILED DESCRIPTION

Reference will now be made in detail to embodiments, examples of which are illustrated in the accompanying drawings. The drawings are intended to be explanatory and may not be drawn to scale. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, configurations and circuits have not been described in detail so as not to unnecessarily obscure aspects of the embodiments.

The term "battery" used herein should be broadly interpreted as referring to any type of device that can store an electric power. The "battery" can mean a rechargeable device, a so-called "secondary battery", or a non-rechargeable device. However, it is possible to take the "battery" for a primary battery or a capacitor that holds electric charge temporarily.

The term "unit cell" used herein should be broadly interpreted as referring to a minimum component in the battery assembly. The "unit cell" is also called "battery unit," "battery cell," "cell unit," etc. In the present embodiment, the term "unit cell" represents the combination of both the "unit cell body" and the "cut-off device." If no "cut-off device" is attached to the "unit cell body," the "unit cell" becomes equal to the "unit cell body."

The term "battery assembly" used herein should be broadly interpreted as referring to any assembly in which it is adapted to accommodate a plurality of unit cells. The term "battery assembly" in this specification refers both to a battery system comprising a plurality of unit cells and to a housing or a container which is adapted to accommodate unit cells and can be built up by a user after shipping. The "battery assembly" may also be referred to as "battery pack," "battery bank," "battery stack," "battery cells," "cell stack," "cell bank" and any other equivalent terms known in the art field.

The term "wiring" used herein should be broadly interpreted as referring to a set or group of electric conductive paths including both single and plural paths. The "wiring" may be composed of single or plural wires or any kind of electric conductive materials such as bar, housing, pattern formed on a substrate or other insulator.

Figure 1:
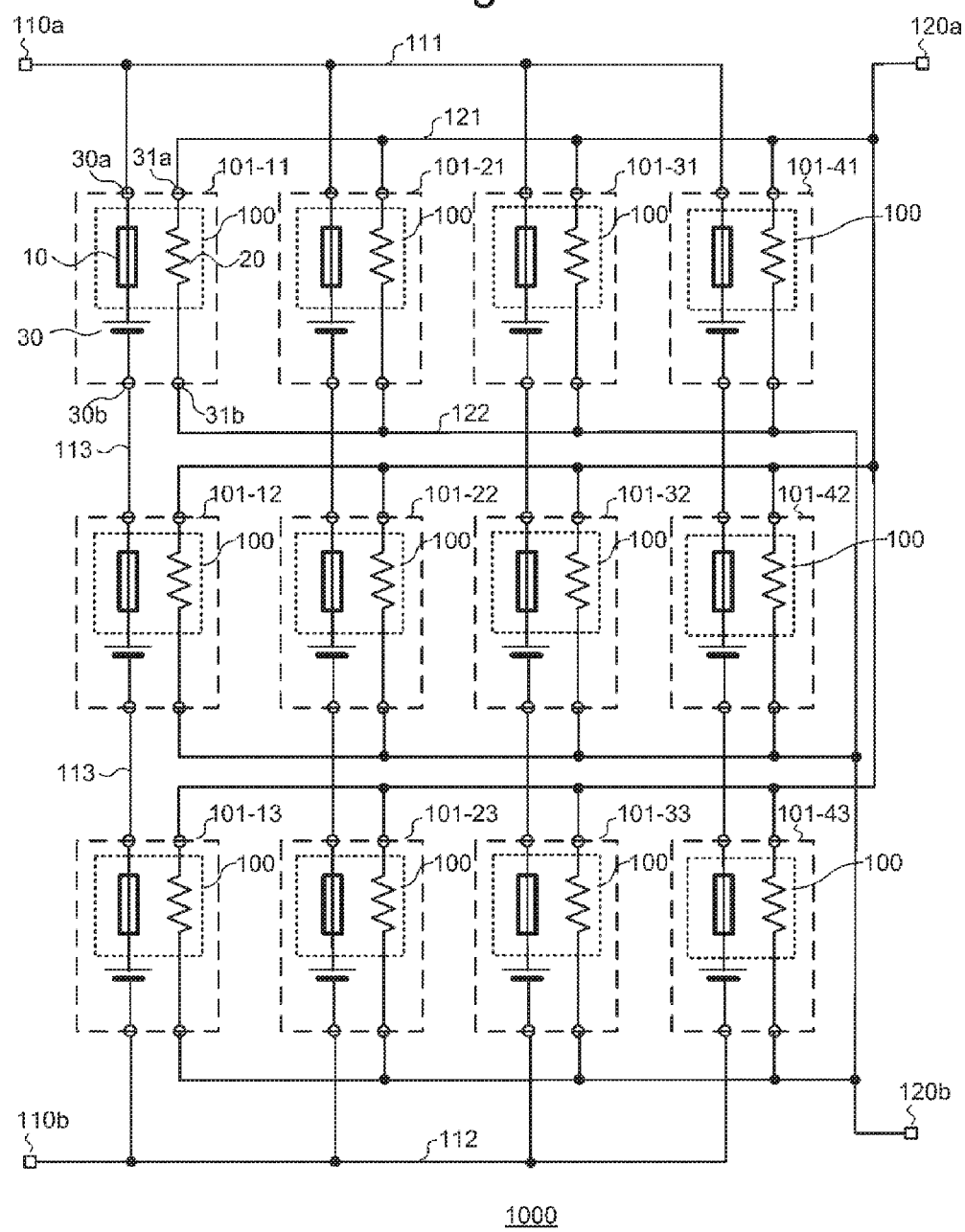
FIG. 1 illustrates a circuit diagram equivalent to an example of a battery assemble in the present embodiment.

FIG. 1 illustrates a circuit diagram equivalent to an example of a battery assembly in the present embodiment. As shown in FIG. 1, a battery assembly 1000 in the present embodiment is adapted to accommodate a plurality of unit cells 101 (hereinafter, the unit cell 101 arranged in column X and row Y (X, Y are arbitrary integers) is referred to as "unit cell 101-XY." The expression "unit cell 101" is referred to as representing any of the unit cells).

In FIG. 1, for example, the battery assembly 1000 comprises a total of 12 unit cells 101-11 to 101-43 with four columns and three rows. The number of columns and rows of the unit cells 101 should be determined arbitrarily in accordance with the specification required for the battery assembly 1000. For example, the number of columns of the unit cells 101 may be determined by an output voltage required for the battery assembly 1000 and a unit voltage of each unit cell 101. The number of rows of the unit cells 101 may be determined by a current capacity required for the battery assembly 1000 and a current capacity per each unit cell 101.

Figure 13:
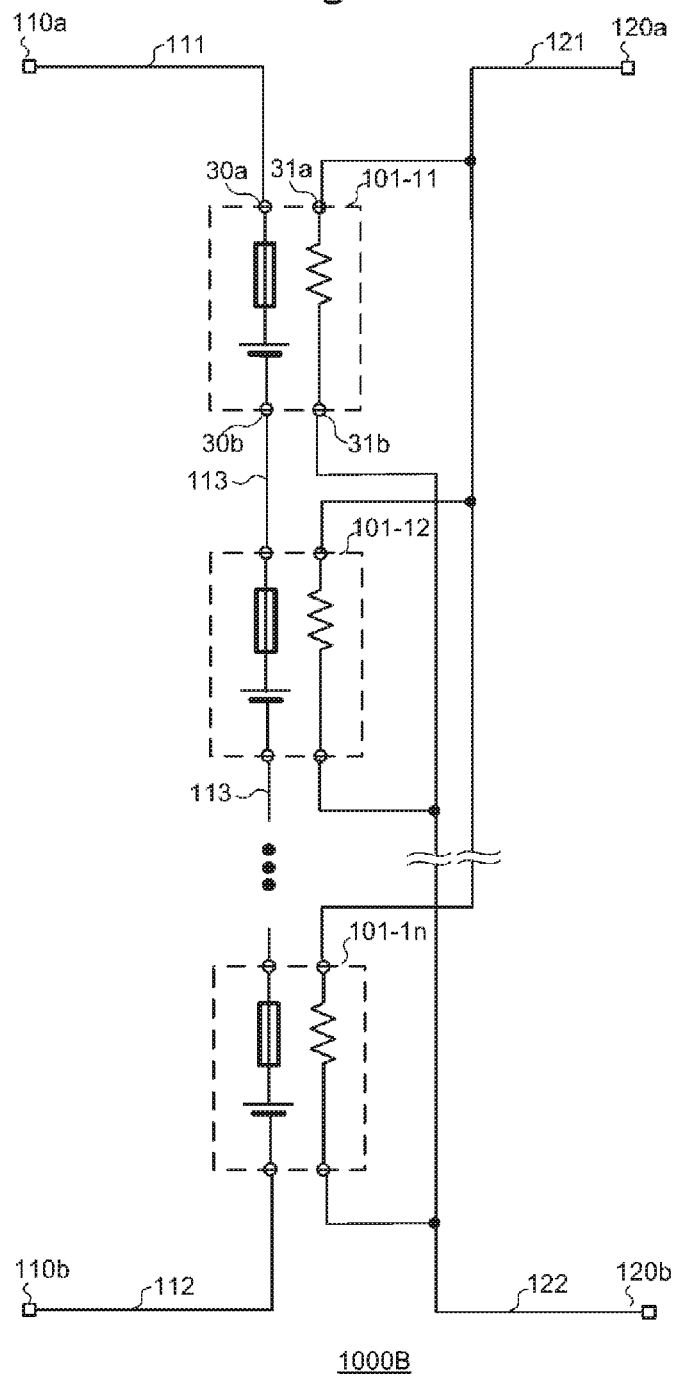
FIG. 13 illustrates a circuit diagram equivalent to an example of a battery assembly in the fifth embodiment.
Figure 14:
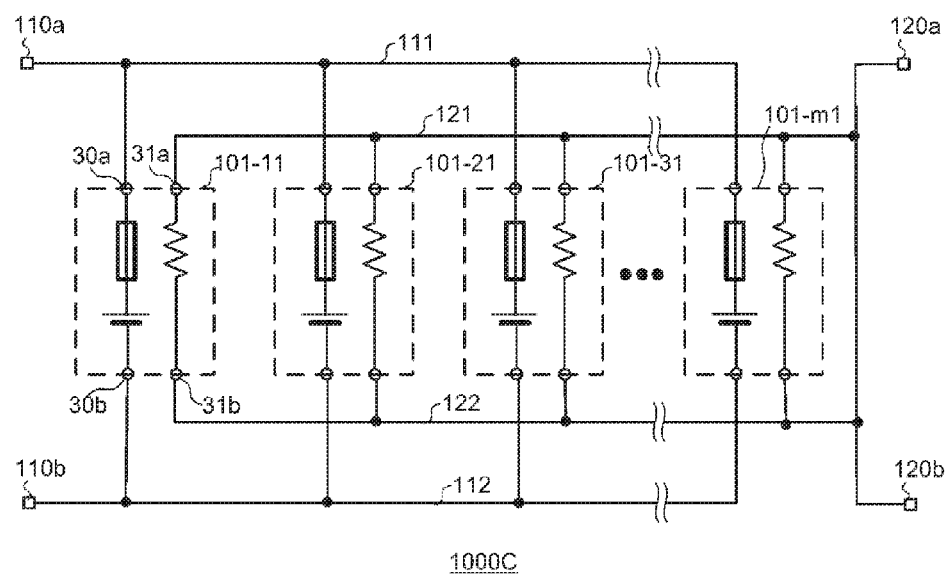
FIG. 14 illustrates a circuit diagram equivalent to an example of a battery assembly in the sixth embodiment.

As shown in FIG. 11, for example, all the unit cells 101 can be connected in series to one another in a battery assembly 1000B. In FIG. 13, the unit cells 101-11 to 101-1$n$ ('n' represents any natural number) are connected in series. This configuration in FIG. 13 can maximize the output voltage of the battery assembly 1000B. On the other hand, as shown in FIG. 14, all the unit cells 101 can be connected parallel to one another in a battery assembly 1000C. In FIG. 14, the unit cells 101-11 to 101-$m$1 ('m' represents any natural number) are connected parallel to one another. This configuration in FIG. 14 can maximize the output current of the battery assembly 1000C. Therefore, the configuration of the battery assembly 1000, such as the number of columns and rows, the total number of unit cells 101 can be determined based on the purpose of use in the system in which the battery assembly supplies an electrical power.

As shown in FIG. 1, the battery assembly 1000 comprises a unit cell wiring 111-113, the unit cells 101 and a power supply wiring 121-122. Each of the unit cells 101 comprises a first unit cell terminal 30$a$, a second unit cell terminal 30$b$, a first heater terminal 31$a$ and a second heater terminal 31$b$. Each of the unit cells 101 comprises a cut-off device 100 and a unit cell body 30.

Figure 2:
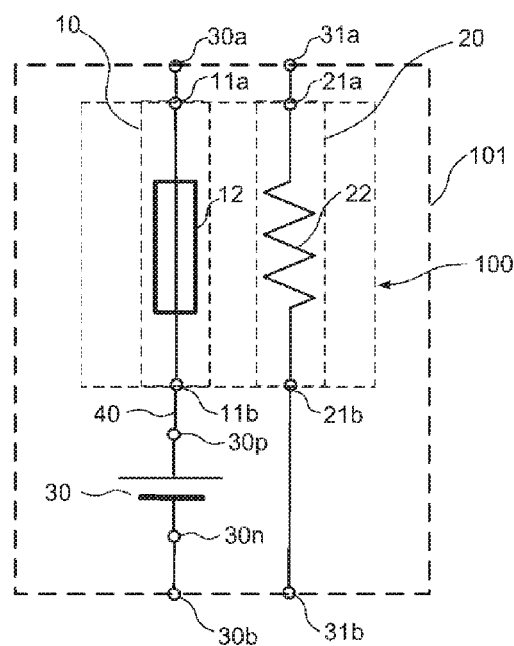
FIG. 2 illustrates a circuit diagram equivalent to an example of a unit cell and a cut-off device in the present embodiment.

FIG. 2 illustrates a circuit diagram equivalent to the unit cell 101 including the cut-off device 100 in the present embodiment. As shown in FIG. 2, each of the unit cells 101 comprises one unit cell body 30 and one cut-off device 100.

The unit cell body 30 is a unit of battery configured to provide an electric power. The unit cell body 30 stores a certain amount of current capacity depending on its configuration.

The unit cell body 30 can be any type of known configuration of rechargeable secondary batteries, such as, lithium-ion battery, lithium-ion polymer battery, nickel-cadmium battery, nickel metal hydride battery, vanadium battery, lead-acid battery, sodium-sulfur battery and the like. Capacitors such as bi-layer capacitor and pseudo capacitor can be used for the unit cell body 30. It should be noted that there is no limitation to the type or configuration of such a rechargeable battery.

The unit cell body 30 has a positive terminal 30$p$ that provides a positive voltage and a negative terminal 30$n$ that provides a negative voltage. The negative terminal 30$n$ of the unit cell body 30 is connected to the second unit cell terminal 30$b$ of the unit cell 101. The unit cell body 30 may provide another type of a terminal such as a ground terminal, depending on type of the battery.

It should also be noted that whether the unit cell 101 includes the unit cell body 30 or not is arbitrarily determined. It can be determined depending on the specification of the battery assembly 1000. According to one aspect, some or all of the unit cell bodies 30 can be installed in the battery assembly 1000 before shipping of the battery assembly. In another aspect, none or some of the entire unit cell bodies 30 can be installed in the battery assembly 1000 when shipping and installed after shipping. In such a case, a user who has purchased the battery assembly 1000 can choose desired unit cell bodies and then, install and connect them to the unit cell wiring 111-113 or cut-off devices 100. Although the circuit diagrams of the present embodiments are illustrated as the unit cell bodies are installed in the battery assembly, such an inclusion of the unit cell bodies 30 is merely for explanation purposes and it should not be construed that the unit cell bodies 30 need to be installed in the battery assembly 1000.

As shown in FIG. 2, the cut-off device 100 has a fuse circuit 10 and a heater circuit 20. The heater circuit 20 is configured to have a heating part 22 that produces heat. The fuse circuit 10 is configured to have a meltable part 12 that disconnects itself by the heat produced in the heater circuit 20.

The fuse circuit 10 in the cutoff device 100 has a first fuse circuit terminal 11a and a second fuse circuit terminal 11b. The first fuse circuit terminal 11a is connected to the first unit cell terminal 30a of the unit cell 101. The second fuse circuit terminal 11b is connected to the positive terminal 30p of the unit cell body 30 via a wiring 40. In FIG. 2, the unit cell body 30 is connected between the second fuse circuit terminal 11b of the cut-off device 100 and the second unit cell terminal 30b of the unit cell 101; however, it should be noted that the unit cell body 30 can be connected between the first unit cell terminal 30a of the unit cell 101 and the first fuse circuit terminal 11a of the cut-off device 100.

The heater circuit 20 in the cut-off device 100 has a first heater circuit terminal 21a and a second heater circuit terminal 21b. The first heater circuit terminal 21a is connected to the first heater terminal 31a of the unit cell 101. The second heater circuit terminal 21b is connected to the second heater terminal 31b of the unit cell 101.

Figure 4:
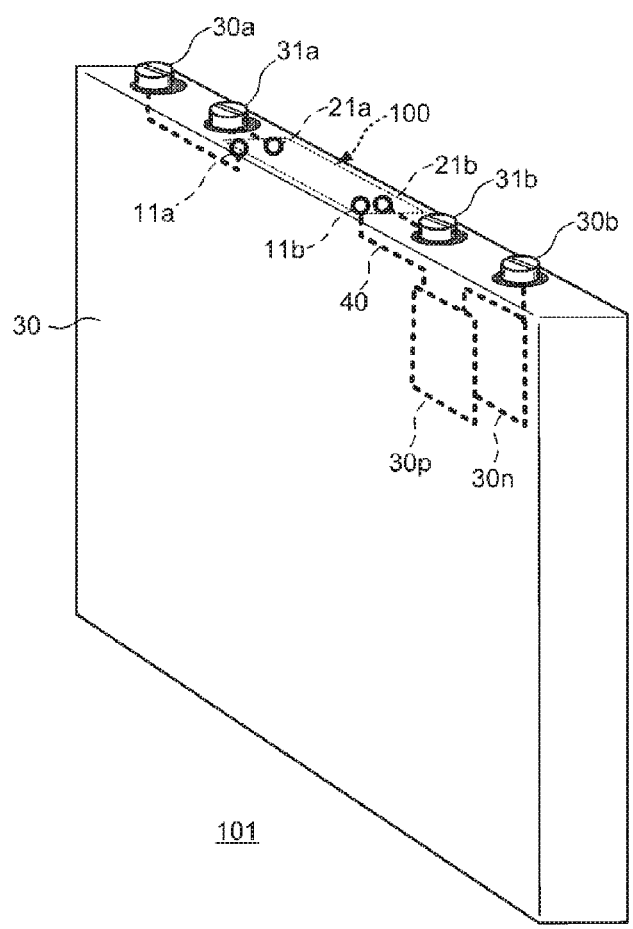
FIG. 4 schematically illustrates an oblique perspective view of a unit cell in the present embodiment.

For example, the cut-off device 100 is configured to be attached to the unit cell body 30 (see FIG. 4 for example). It should be noted that the cut-off device 100 can be positioned to anywhere other than on the unit cell body 30 as long as it can be disconnected by supplying an electric power. The detailed configuration of the cut-off device 100 will be explained later. The cut-off device 100 can also be embedded in the unit cell body 30.

Referring back to FIG. 1, the unit cell wiring 111-113 is configured to provide at least one connection for the unit cells 101. Such a connection can include one or more series connections that connect some of the unit cells 101 in series to one another and/or one or more parallel connections that connect some of the unit cells 101 or some of the series connections of the unit cells 101 parallel to one another. The configuration of the series and/or parallel connections should not be considered to be limited to a specific connection configuration such as described in the present embodiments.

In FIG. 1, for example, the unit cell wiring 111-113 provides four series connections in columns and three parallel connections with the four series connections in rows. The first series connection comprises the unit cells 101-21 to 101-23; the second series connections comprises the unit cells 101-31 to 101-23; the third series connection comprises the unit cells 101-31 to 101-33; and the fourth series connection comprises the unit cells 101-41 to 101-43. The unit cell wiring 111 is configured to connect each of the first unit cell terminals 30a of the unit cells 101-11 to 101-41 in the four series connections to one another in order to supply a positive voltage with a first battery terminal 110a. The unit cell wiring 112 is configured to connect the second unit cell terminals 30b of the unit cells 101-13 to 101-43 to one another in order to supply a negative voltage with a second battery terminal 110b. Each of a plurality of the unit cell wirings 113 is configured to connect the second unit cell terminal 30b of one unit cell 101 and the first unit cell terminal 30a of the next unit cell 101 to one another in order to provide the series connections.

In FIG. 1, for example, the power supply wiring 121-122 is configured to supply the heater circuit 20 of the cut-off device 100 with an electric power. In FIG. 1, for example, the power supply wiring 121 is configured to connect each of the first heater terminals 31a of the plurality of the unit cells 101 to one another in order to provide a positive voltage from a first power supply terminal 120a. The power supply wiring 122 is configured to connect each of the second heater terminals 31b of the plurality of the unit cells 101 to one another in order to provide a negative voltage from a second power supply terminal 120b. As explained later, the first and second power supply terminals 120a and 120b are connected to power supply terminals of a power supply. It should be noted that all of the heater circuits 20 are connected parallel to each other.

Figure 3A:
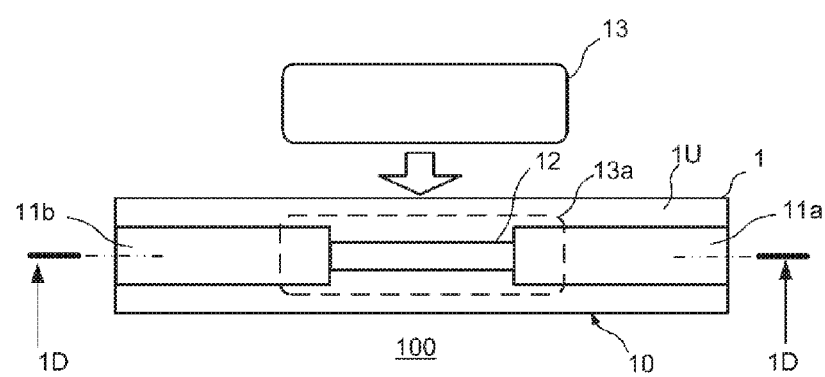
FIG. 3A schematically illustrates a plan view of a cut-off device in the first embodiment.
Figure 3B:
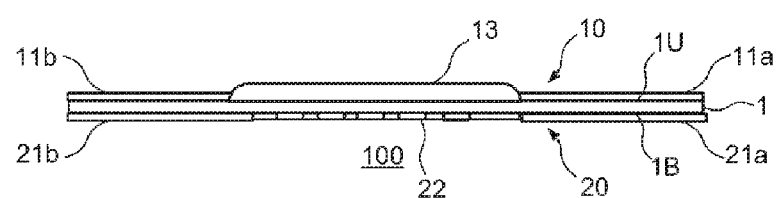
FIG. 3B schematically illustrates a side view of a cut-off device in the first embodiment.
Figure 3C:
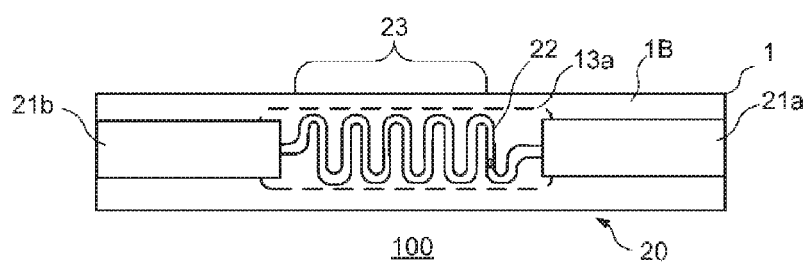
FIG. 3C schematically illustrates a bottom view of a cut-off device in the first embodiment.
Figure 3D:
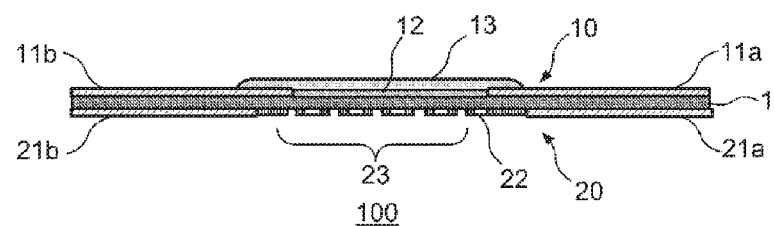
FIG. 3D schematically illustrates a cross-sectional view across line 1D of FIG. 3A for a cut-off device in the first embodiment.

The detailed configuration of the cut-off device 100 in the first embodiment will be explained below. FIG. 3A schematically illustrates a plan view of the cut-off device 100. FIG. 3B schematically illustrates a side view of the cut-off device 100. FIG. 3C schematically illustrates a bottom view of the cut-off device 100. FIG. 3D schematically illustrates a cross-sectional view of FIG. 3A for the cut-off device 100.

As shown in FIGS. 3A-3D, the cut-off device 100 in the first embodiment comprises the fuse circuit 10, the heater circuit 20, and an insulation substrate 1. The insulation substrate 1 is formed in a rectangular shape as one example. The shape of the substrate, however, is not limited to the above.

As shown in FIG. 3A, the fuse circuit 10 of the first embodiment is formed on an upper side 1U of the insulation substrate 1. The fuse circuit 10 comprises the first fuse circuit terminal 11a, the second fuse circuit terminal 11b and the meltable part 12. The first fuse circuit terminal 11a is formed at a first end on the upper side 1U and the second fuse circuit terminal 11b is formed at a second end on the upper side 1U. The meltable part 12 is formed between the first and second fuse circuit terminals 11a and 11b.

The fuse circuit 10 has a function similar to a device usually referred to as a "temperature fuse" or "thermal cut-offs" in the related technical field. The fuse circuit 10 is configured to isolate and disconnect a circuit and irrevocably prevent further flow of a current between the first fuse circuit terminal 11a and the second fuse circuit terminal 11b by melting and breaking the meltable part 12 when an environmental temperature around the fuse circuit 10 or a flowing current rises to a certain extent. Such an environmental temperature may be a temperature of the unit cell body 30 arisen due to an abnormality, such as excessive charging, excessive discharging or short circuiting the unit cell body 30. In the cut-off device 100 of the present embodiment, however, the environmental temperature can be not only the one produced due to such abnormality but also the one intentionally produced and conducted from the heater circuit 20 when it is necessary.

The first and second fuse circuit terminals 11a and 11b can be formed by any conductive material as metal. The terminals 11a and 11b can be formed on the upper side 1U of the insulation substrate 1 using a well-known method such as the photo lithographic method.

The meltable part 12 is composed of a material to have a certain melting temperature at which the meltable part melts and breaks. Such a melting temperature of the meltable part 12 can be a temperature that is thermally conducted from the heating part 22 of the heater circuit 20 through the insulation substrate 1 when a certain amount of electric power is applied to the heater circuit 20. More specifically, the meltable part 12 can be made of a material having a melting point lower than a heat-resistant temperature of the insulation substrate 1. This is because when the power is applied to the heater circuit 20 and heat generated in the heating part 22 is conducted to the meltable part 12 of the fuse circuit 10 to melt and disconnect the meltable part 12, the insulation substrate 1 should be durable to such conducting heat.

As the material for the meltable part 12, any material that melts at a desired melting point can be employed. The material for the meltable part 12 can be chosen so as to melt at the desired melting point. As one example for the material of the meltable part 12, a low-temperature solder material can be used. In one aspect, the melting point of the low-temperature solder, such as zinc-tin solder, can be set 80 degree Celsius to 100 degree Celsius. As well, any other metal alloy can be employed for the material of the meltable part 12. For the technical field related to the "temperature fuse," various kinds of meltable alloy are used. These kinds of meltable alloy can be also used in the meltable part 12 of the present embodiment. For example, materials used in thermal cut-offs: EYP series produced by Panasonic Corporation can be used for the material of the meltable part 12. In the EYP series thermal cut-offs, the melting point (functioning temperature) varies from 80 degree Celsius to 150 degree Celsius. Any of the material used in the thermal cut-offs can be employed.

As shown in FIG. 3A, a protection layer 13 can be formed at least over the meltable part 12 of the fuse circuit 10 as indicated as an area 13*a*. The protection layer 13 is formed to physically and chemically protect the meltable part 12. Such a protection layer 13 can cover the entire surface of the upper side 1U of the insulation substrate 1. For a material for the protection layer 13, an organic solder flux material can be used for example, but not limited thereto.

As shown in FIG. 3C, the heater circuit 20 of the present embodiment is formed on a bottom side 1B of the insulation substrate 1. The heater circuit 20 comprises the first heater circuit terminal 21*a*, the second heater circuit terminal 21*b*, and the heating part 22. The first heater circuit terminal 21*a* is formed at a first end on the bottom side 1B and the second fuse circuit terminal 11*b* is formed at a second end on the bottom side 1B. The heating part 22 is formed between the first and second heater circuit terminals 21*a* and 21*b*.

The first and second heater circuit terminals 21*a* and 21*b* can be formed by any conductive material as metal. The terminals 21*a* and 21*b* can be formed on the bottom side 1B of the insulation substrate 1 using a well-known method such as the photo lithographic method.

The heating part 22 is composed of a material to produce heat by supplying with an electric power. The material of the heating part 22 is the one that produces a certain amount of heat bringing about a rise in temperature and an ambient temperature when a certain amount of electric power is applied to the heating part 22. Such a temperature can be conducted as conductive heat and/or radiation heat. If the meltable part 12 of the fuse circuit 10 is arranged sufficiently close enough to receive such radiation heat produced in the heating part 22 of the heater circuit 20, the radiation heat can break the meltable part 12. Even if the meltable part 12 is not arranged close enough to receive the radiation heat but arranged to receive the conductive heat from the heating part 22, the conductive heat can also break the meltable part 12. In the present embodiment, as shown in FIGS. 3A-3D, as the insulation substrate 1 is arranged between the meltable part 12 and the heating part 22, the conductive heat transferred through the insulation substrate 1 mainly functions for melting the meltable part 12. However, which of the conductive heat and the radiation heat has the meltable part 12 melted does not matter a lot, as long as either or both of the heats can break the fuse circuit 10.

For the material for the heating part 22, any material that can produce heat by applying an electric power can be employed. One example for the material is an alloyed metal, such as nickel-chromium alloy, iron-chromium alloy. Another example for the material is a material including carbon. Thus, for the material for the heating part 22, a material selected from a group consisting of carbon, silver, ferrum-chrome-aluminum alloy, nickel-chromium alloy, nickel-chrome-ferrum alloy, platinum and ruthenium oxide can be employed. Such a material has relatively low electric resistance that is not sufficient enough to be an electric conductive material and produces Joule heat when an electric current flows.

Such a material for the heating can be arranged in the form of a wire or a paste. A heating wire such as nickel-chromium wire, iron-chromium wire is commercially available and therefore, it is easily obtained. A heating paste is also commercially available. Such a heating paste can include electrically conductive metal particles such as silver. By adjusting the amount of particles contained in a paste, the heating ability or electric conductivity can be easily controlled so as to meet a required condition. In the present embodiment, for example, a carbon paste is used as the material for the heating part 22. The carbon paste is useful because it is inexpensive and readily available.

As shown in FIG. 3C, the carbon paste is attached so as to at least cover an area where the meltable part 12 on the upper side 1U is formed. In the area, the carbon paste is formed in a meandering shape 23 to retain a certain full length. Such a full length of the heating part 22 is determined so as to produce sufficient heat to break the meltable part 12 on the opposite side of the insulation substrate 1. Any other shape of the heating part 22 such as a zigzag, winding or more complicated shape can be employed. The heating part 22 can be formed by the known-lithographic method, disposition method by a dispenser or an inkjet method. The bottom side 1B of the insulation substrate 1 can also be covered partially or entirely by a protection firm. By applying the carbon paste as the heating part 22, the heater circuit 20 can be designed to have a certain resistivity such as 40 ohm and a suitable applying voltage of 16 V. In this configuration, it is possible to heat the fuse circuit 10 to the tripping temperature or above in about 0.25 seconds.

As shown in FIG. 3B or 3D, the insulation substrate 1 has a certain thickness. The thickness of the insulation substrate 1 is determined such that a heat sufficiently hot enough to break the meltable part 12 on the upper side 1U can be conducted from the heating part 22 on the bottom side 1B of the insulation substrate 1. The thinner the insulation substrate 1 becomes, the more efficiently the heat can be conducted from the heating part 22 to the meltable part 12. On the other hand, the thinner the insulation substrate 1 becomes, the weaker the mechanical strength of the insulation substrate 1 becomes. Therefore, the thickness of the insulation substrate 1 should be determined by balancing the heat conductivity and the mechanical strength.

The insulation substrate 1 can be composed of heat conducting material. Metal is known as a material conducting heat well; however, the metal not only conducts heat but also electric current. If an electric resistance of the insulation substrate 1 is less than a certain amount, the heater circuit 20 may be short-circuited and it becomes difficult to produce heat. Therefore, the material for the insulation substrate 1 should be an insulator that can maintain a certain amount of electric resistance to avoid such a problem. Any kinds of glass or resin can be employed to form the insulation substrate 1. For example, polyimide can be employed for the material of the insulation substrate 1.

The insulator can be provided in the form of a substrate as the insulation substrate 1 in the present embodiment. The insulator can also be provided in the form of a film. Such a substrate or a film may be flexible. A polyimide film is commercially available and can be employed for the insulation substrate 1 in the present embodiment.

The cut-off device 100 can be sealed with a sealant such as a resin. For example, epoxy may be used for the sealant. The cut-off device 100 can also be covered by a housing or case. The housing or case may be composed of a resin or ceramic. Alternatively, the cut-off device 100 can be embedded in the unit cell body 30. In such a case, the cut-off device 100 may be formed in a compartment formed in a casing or housing of the unit cell body 30.

FIG. 4 schematically illustrates an oblique perspective view of the unit cell 101 in the present embodiment. As shown in FIG. 4, the unit cell 101 comprises the unit cell body 30 and the cut-off device. In the present embodiment, the cut-off device 100 is provided with each of the unit cells 101. As explained above, however, the cut-off device 100 cannot be provided with all of the unit cells 101 but instead can be provided with single or some of the unit cells 101.

In FIG. 4, the cut-off device 100 is attached on a top surface of the unit cell body 30. The unit cell body 30 has the positive terminal 30*p* on a first side surface and the negative terminal 30*n* on a second side surface. The unit cell body also has the first unit cell terminal 30*a*, the second unit cell terminal 30*b*, the first heater terminal 31*a*, and the second heater terminal 31*b*. The first unit cell terminal 30*a* is connected to the first fuse circuit terminal 11*a* of the cut-off device 100. The second unit cell terminal 30*b* is connected to the negative terminal 30*n* of the unit cell body 30. The first heater terminal 31*a* is connected to the first heater circuit terminal 21*a* of the cut-off device 100. The second heater terminal 21*b* is connected to the second heater circuit terminal 31*b*. The second fuse circuit terminal 11*b* is connected to the positive terminal of the unit cell body 30.

The unit cell 101 is covered, for example, by a plastic film entirely except for the terminals 30*a*, 30*b*, 31*a*, and 31*b*. The cut-off device 100 and all the wirings connecting the terminals 30*a*, 30*b*, 31*a*, 31*b*, 11*a*, 11*b*, 21*a*, 21*b*, 30*p*, and 30*n* to one another are physically and chemically protected by the plastic film. This configuration of the unit cell 101 may be provided by a manufacturer of the unit cell 101. Attaching and wiring the cut-off device 100 to the unit cell body 30 may be done at the same time when the unit cell 101 is manufactured or after manufactured separately.

In the configuration where the cut-off device 100 is attached to the unit cell body 30, the cut-off device 100 can be attached to a first location where a local temperature of the unit cell body 30 in use is expected to rise more than in a second location of the unit cell body 30. In a particular use, the cut-off device 100 can be attached to a location where a local temperature of the unit cell body 30 in use is expected to rise the most in the unit cell body 30.

As explained above, the meltable part 12 of the cut-off device 100 can be melted and broken by a temperature produced in the unit cell body 30, when such a temperature rises due to an abnormality, such as excessive charging, excessive discharging or short circuiting the unit cell body 30. In one aspect, such a place where the temperature rises when such an abnormality occurs in the unit cell body 30 may be known in advance. Therefore, the cut-off device 100 may be attached to such a place where the temperature of the unit cell body 30 is expected to rise more than other places or to become the most among the entire surface of the unit cell body 30. According to this configuration, the cut-off device 100 is used not only for disconnecting each of the unit cells 101 when disassembling, but also for preventing the unit cell body 30 or the battery assembly 1000 from abnormally raising its temperature in use and causing more serious problems.

FIG. 5 schematically illustrates an oblique perspective view of the battery assembly 1000 in the present embodiment. FIG. 5 shows merely one example of the battery assembly 1000, and any other configuration of the battery assembly can be employed.

As shown in FIG. 5, the battery assembly 1000 is adapted to accommodate a plurality of the unit cells 101. The plurality of the unit cells 101 can be stacked in a row in a compartment of a housing 32. As explained above, all or any of the unit cells 101 have the cut-off device 100 respectively. The first battery terminal 110*a* and the second battery terminal 110*b* are provided at one side of the housing 32 of the battery assembly 1000. The first battery terminal 110*a* becomes a positive output terminal and the second battery terminal 110*b* becomes a negative output terminal when the same wiring as FIG. 1 is applied.

FIG. 6A schematically illustrates an oblique perspective view of the battery assembly 1000 in normal use. As shown in FIG. 6A, the wiring 111 is provided to connect some of the first unit circuit terminal 30*a* and the wiring 112 is provided to connect some of the second unit circuit terminals 30*b*. The wiring 113 is now shown in the figure.

The battery assembly 1000 can further comprise a power supply 33. The power supply 33 has the first heater terminal 120*a* and the second heater terminal 120*b* as explained above referring to FIG. 1. In another aspect, the power supply 33 is installed in advance in the battery assembly 1000 by a manufacturer. However, the power supply 33 can be installed by a user after shipping. A power supply wiring 121 and 122 are also provided to provide a connection from the power supply 33. The power supply wiring 121 is provided to connect each first heater terminal 31*a* of the unit cell 101 to one another and the power supply wiring 122 is provided to connect each second heater terminal 31*b* of the unit cell 101 to one another. A short-circuiting wiring 123 can be provided to connect the power supply wiring 121 and 122 to each other. The short-circuiting wiring 123 is provided to avoid inadvertently applying a voltage to the heater circuit 20 of the cut-off device 100 by short-circuiting the power supply wiring 121 and 122. In a normal use, no connection is provided between the power supply wiring 121 and 122 to the power supply terminals 120*a* and 120*b*.

Further, a method of disconnecting the unit cells in the present embodiment will be explained below. FIG. 6B schematically illustrates an oblique perspective view of the battery assembly when disassembling in the present embodiment.

Disassembling the battery assembly most likely happens when such a battery assembly is discarded. However, even if the expiration of life of the battery assembly has yet to come, it is sometimes necessary to disassemble the battery assembly for the purpose of repair or replacement of its cell unit or other parts.

As shown in FIG. 6B, when disassembling the battery assembly, the short-circuiting wiring 123 is detached first if such a short-circuiting wiring 123 has been arranged. Next, the power supply wiring 121 is connected to the power supply terminal 120*a* of the power supply 33. In addition, the power supply wiring 122 is connected to the power supply terminal 120*b* of the power supply 33. Then, a power switch (not shown) of the power supply 33 is turned on.

By turning on the power supply 33, an electric power is supplied to the heater circuit 20 of the cut-off device 100 in each unit cell 101. Because the heater circuit 20 is configured to produce heat by supplying the electric power, the heat is produced and conducted to the meltable part 12 of the fuse circuit 10 through the insulation substrate 1 from the heating part 22 of the heater circuit 20. Since the electric power supplied from the power supply 33 is adjusted high enough to disconnect the meltable part 12 of the fuse circuit 10, each fuse circuit 10 is disconnected and each unit cell body 30 is electrically isolated from the others. Accordingly, after completion of the disconnection above, the battery assembly 1000 can be safely disassembled and separated by cutting the wiring 111-113, even if some of the unit cell bodies 30 have some charge remaining.

Figure 7:
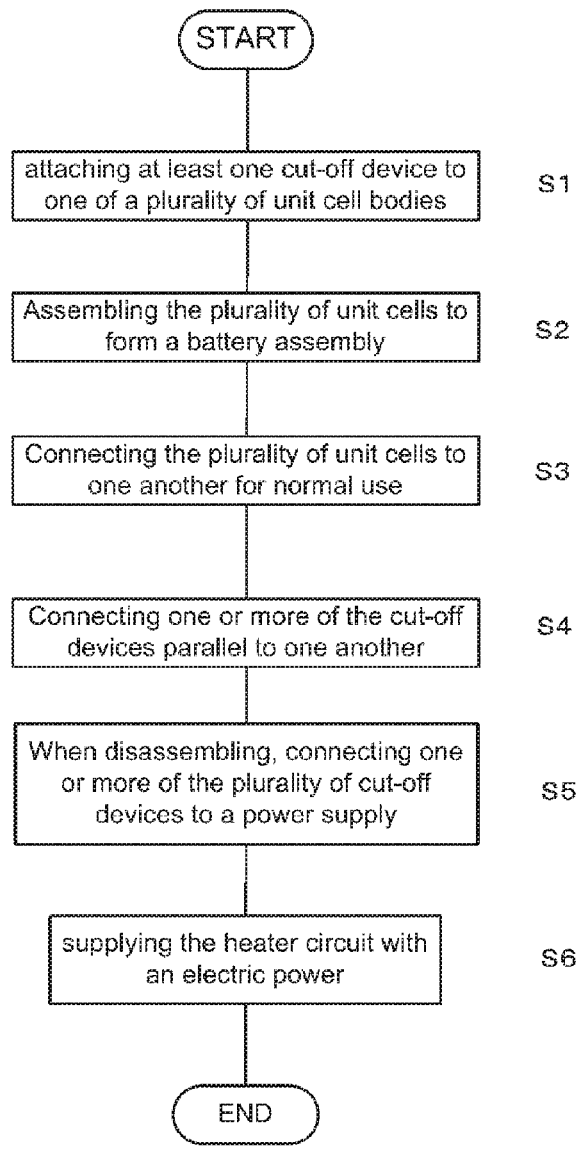
FIG. 7 illustrates an exemplified flow chart for assembling and disassembling the battery assembly in the present embodiment.

FIG. 7 illustrates an exemplified flow chart for assembling and disassembling the battery assembly in the present embodiment. As shown in FIG. 7, a method for assembling a battery assembly comprises the following steps:

(step S1) attaching at least one cut-off device 100 to at least one of a plurality of unit cell bodies 30, the cut-off device 100 having a fuse circuit 10 and a heater circuit 20;

(step S2) assembling the plurality of the unit cells 101 to form a battery assembly 1000;

(step S3) connecting the plurality of the unit cells 101 via at least one of the fuse circuits 10 to one another so as to provide at least one series and/or parallel connection for normal use; and (step S4) connecting one or more of the heater circuits 20 of the cut-off devices 100 parallel to one another.

In the above-steps, the step S2 can be performed before the step S1 and the step S4 can be performed before the step S3.

When disassembling the battery assembly 1000, the following step is further performed.

(step S5) connecting one or more of the cut-off devices 100 to a power supply; and (step S6) supplying the heater circuit 20 with an electric power to disconnect the fuse circuit 10 by heat produced in the heater circuit 20.

It should be understood that the connection of one or more of the cut-off devices 100 at step S4 can be done when disassembling. It should be also understood that the connection of one or more of the cut-off devices 100 to the power supply can be done when assembling if a power switch is provided with the power supply. If there is no power switch is provided in the power supply, the steps S5 and S6 are performed at the same time when the connection to the power supply is made.

For example, if the same material as thermal cut-offs EYP 2MP series (Panasonic Corporation) is employed for the melting part 12 of the fuse circuit 10, it is possible to heat all of the single unit cells 101 to the fuse operating temperature in 0.25 seconds with external power of about 1.6V and 80 W from the power supply 33.

Lastly, it should be noted that the cut-off device can be inserted in any connections in the battery assembly. It is possible to provide the cut-off device with each unit cell, as above. With the configuration, all the unit cells are electrically isolated from each other and therefore, safe disassembling is secured. However, it is not necessary for the cut-off device with all of the unit cells. If the cut-off devices are not provided for all of the unit cells, such configuration will save on the costs of the cut-off devices.

Figure 8:
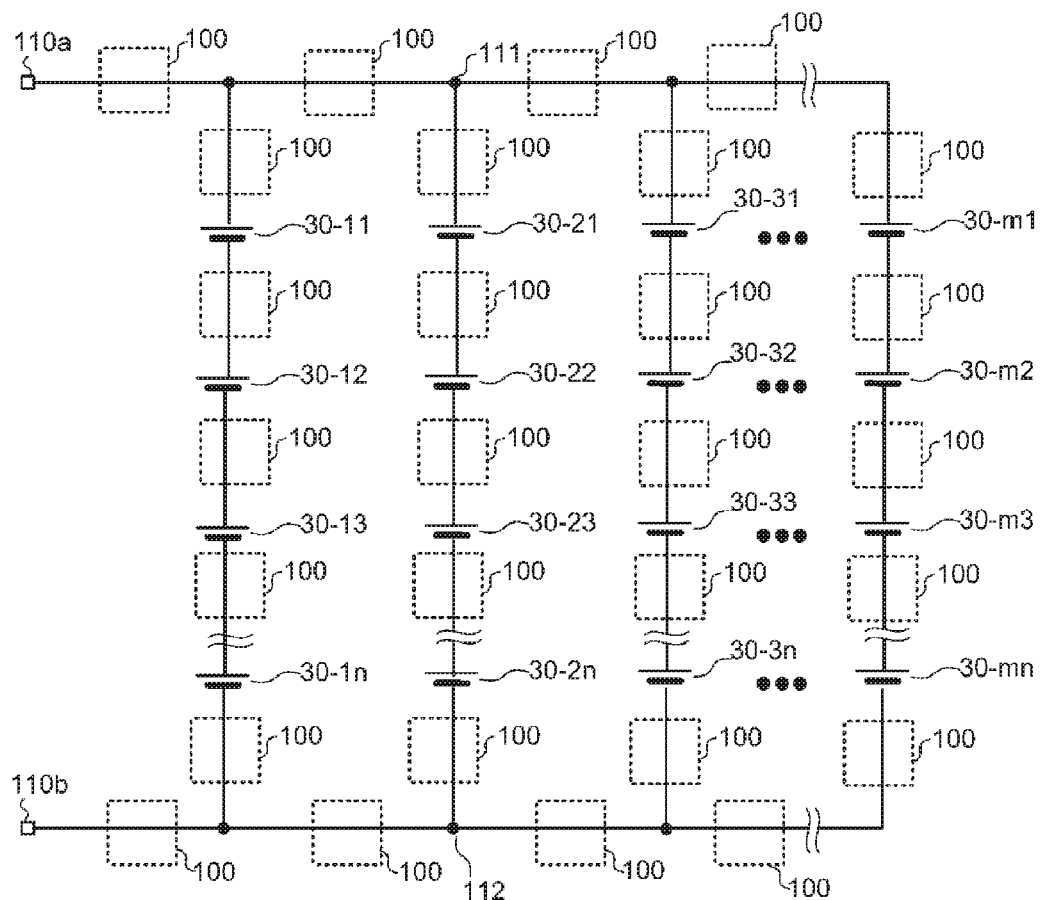

FIG. 8 indicates positions where the cut-off device can be inserted in the battery assembly 1000 of FIG. 1. As shown in FIG. 8, the cut-off device can be installed between the unit cell bodies 30 or at the top and/or the bottom of the series connections, or between the parallel connection of the series connections.

According to the first embodiments, as the battery assembly 1000 is provided with the cut-off device 100 and the power supply wiring 121 and 122, it is possible to electrically disconnect the unit cell bodies 30 so that disassembling of the battery assembly can be safely achieved. It is not necessary to mount any special component to cut the electrical connection between unit cells. It becomes possible to electrically separate the unit cells 101 at the time of recovery or recycling by simply applying an electric power to the heater circuit 20 in the immediate vicinity of each fuse circuit 10.

According to the first embodiment, as the heater circuits 20 are all connected in parallel, it is possible to electrically isolate all of the unit cells 101 substantially at the same time by applying the electrical power to the heater circuits 20. Accordingly, safety for recovery and recycling the battery assembly is considerably improved.

According to the first embodiment, as the cut-off device 100 is attached to the unit cell body 30, it is possible to fuse the cut-off device when any of the unit cell bodies 30 operates abnormally.

Figure 9A:
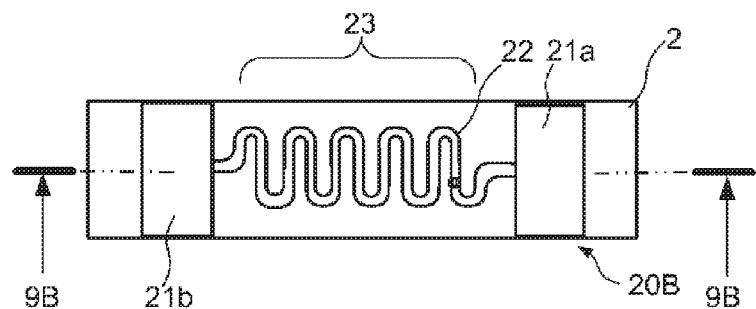
FIG. 9A schematically illustrates a plan view of a heater circuit of a cut-off device in the second embodiment.
Figure 9B:
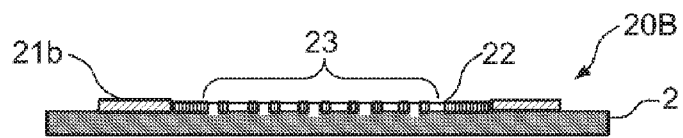
FIG. 9B schematically illustrates a cross-sectional view across line 9B of FIG. 9A for a heater circuit of a cut-off device in the second embodiment.

A second embodiment will be explained hereinafter referring to FIGS. 9A, 9B, 10A, and 10B. FIG. 9A schematically illustrates a plan view of a heater circuit 20B of a cut-off device 100B in the second embodiment. FIG. 9B schematically illustrates a cross-sectional view of FIG. 9A for the heater circuit 20B of the cut-off device 100B.

The second embodiment provides an alternative configuration of the cut-off device. The cut-off device 100B in the second embodiment comprises a fuse circuit 10 and a heater circuit 20B stacked on the fuse circuit 10.

As compared with the cut-off device 100 in the first embodiment, the cut-off device 100B in the second embodiment is the same as the cut-off device 100 in that the same fuse circuit 10 as the first embodiment is used, but differs from the first embodiment in that the heater circuit 20B is stacked on the fuse circuit 10 formed on the upper side 1U of the insulation substrate 1 instead of forming on the bottom side 1B of the insulation substrate 1. In other words, the fuse circuit 10 and the heater circuit 20B are fabricated individually, and thereafter, they are combined with each other. The same reference numerals as those used in the first embodiment are also used in this embodiment where the same configuration and materials as the first embodiment are applied. Their detailed explanations for the configuration and materials are omitted.

As shown in FIGS. 9A and 9B, the heater circuit 20B of the cut-off device 100B in the second embodiment is configured to be a circuit separated from the fuse circuit 10. The heater circuit 20B is formed the first heater circuit terminal 21a, the second heater circuit terminal 21b, and the heater part 21 on an insulation substrate 2. The insulation substrate 2 is different in shape from the insulation substrate 1 on which the fuse circuit 10 is formed. This is because that even after stacking the heater circuit 20B, the first and second fuse circuit terminals 11a and 11b of the fuse circuit 10 should not be covered in order to secure wire connection areas for the fuse circuit 10. For the insulation substrate 2, the same materials as the insulation substrate 1 can be used. The size and shape of the first and second heater circuit terminals 21a and 21b may be changed to fit the insulation substrate 2. The heater part 21 is the same as the first embodiment. It also has the meandering shape part 23.

Figure 10A:
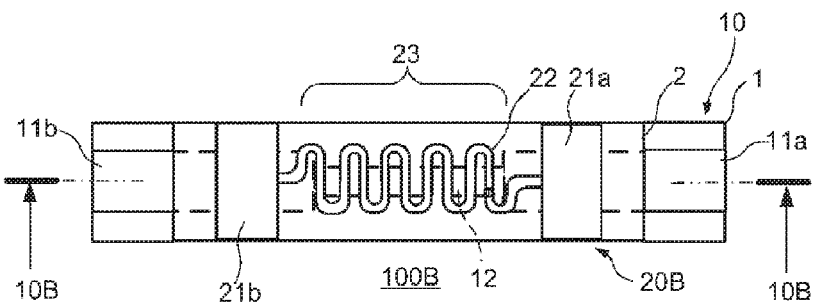
FIG. 10A schematically illustrates a plan view of a cut-off device combined the heater circuit of FIG. 9A with a fuse circuit in the second embodiment.
Figure 10B:
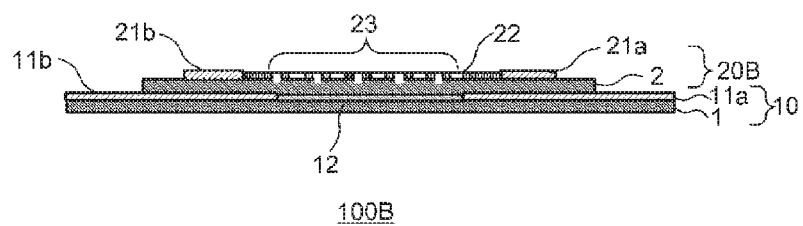
FIG. 10B schematically illustrates a cross-sectional view of FIG. 10A for a cut-off device in the second embodiment.

FIG. 10A schematically illustrates a plan view of the cut-off device 100B combined the heater circuit 20B of FIG. 9A with the fuse circuit 10. FIG. 10B schematically illustrates a cross-sectional view of FIG. 10A of the cut-off device 100B.

As shown in FIGS. 10A and 10B, after manufacturing the fuse circuit 10 and the heater circuit 20B individually, both the circuits are combined. For attaching the heater circuit 20B to the fuse circuit 10, a known adhesion material can be used. Such an adhesion material may have a certain heat conductivity with a heat resistant characteristic.

According to the second embodiment, the heater circuit 20B and the fuse circuit 10 can be individually manufactured. Therefore, it is possible to provide a cut-off device that can be manufactured more easily.

A third embodiment will be explained hereinafter referring to FIGS. 11A to 11C. The third embodiment provides another alternative configuration of the cut-off device.

Figure 11A:
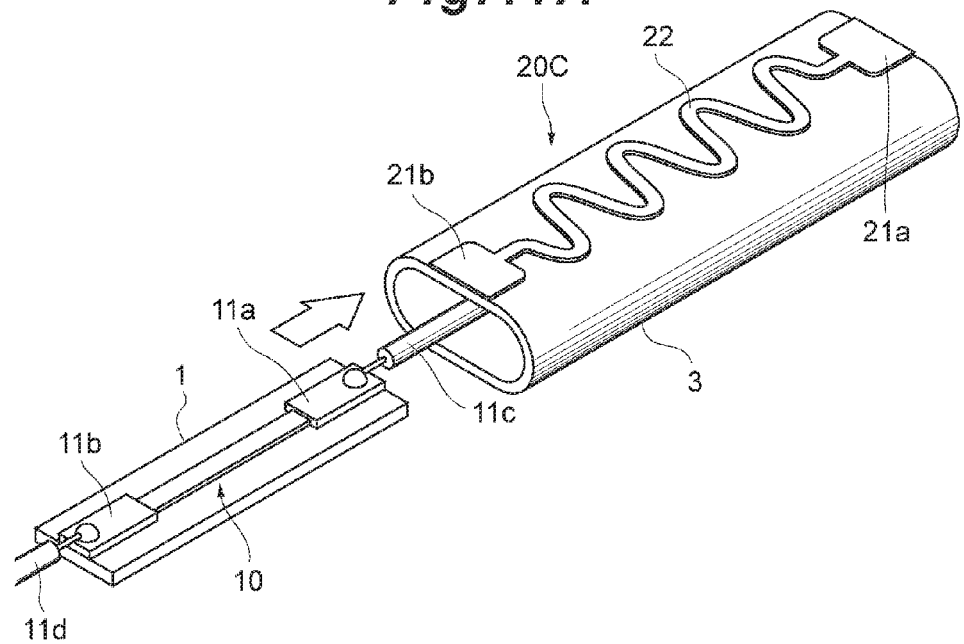
FIG. 11A schematically illustrates an oblique view of a cut-off device before combining a fuse circuit with a heater circuit in the third embodiment.

FIG. 11A schematically illustrates an oblique view of a cut-off device 100C in the third embodiment before combining the fuse circuit 10 with the heater circuit 20C. FIG. 11B schematically illustrates an oblique view of the cut-off device 100C in the third embodiment before wiring. FIG. 11C schematically illustrates a completed oblique view of the cut-off device 100C in the third embodiment.

As compared with the cut-off device 100 in the first embodiment, the cut-off device 100C in the third embodiment is the same as the first embodiment in that the same fuse circuit 10 as the first embodiment is used, but differs from the first embodiment in that the heater circuit 20C is formed on an insulation tube 3 which covers the fuse circuit 10 entirely. In other words, the cut-off device 100C in the third embodiment has an encapsulated tube shape. The same reference numerals as those used in the first embodiment are also used in this embodiment where the same configuration and materials as the first embodiment are applied. Their detailed explanations for the configuration and materials are omitted.

As shown in FIG. 11A, the fuse circuit 10 as explained in the first embodiment can be used. First, a first and second wirings 11c and 11d are soldered at the first and second fuse circuit terminals 11a and 11b before encapsulating the fuse circuit 10. The first and second wirings 11c and 11d are a part of the unit cell wiring. Then, the wired fuse circuit 10 is inserted through the insulation tube 3 on which the heater circuit 20C is formed.

The insulation tube 3 is a tube made of a heat constriction material. Such a heat constriction tube can be made of, for example, an electron bridge-building flexible plastic such as a polyolefin resin, PVC, fluorinated resin, etc. Various sizes and specifications of the heat constriction tube are commercially available. The diameter of the insulation tube 3 can be the same as or more of the width of the fuse circuit 10. The length of the insulation tube 3 can be the same as or more of the length of the fuse circuit 10.

The first and second heater circuit terminals 21a and 21b and the heating part 22 between the terminals 21a and 21b are formed on a surface of the insulation tube 3. The heating part 22 is formed to overlap and cover the area where the meltable part 12 of the fuse circuit 10 is positioned after encapsulating.

Alternatively, an insulation configuration provided by a resin tape or resin coating can be applied to instead of the insulation tube 3. In this alternative embodiment, the heater circuit 20C may be formed after the insulation configuration is formed by the resin tape or resin coating.

Figure 11B:
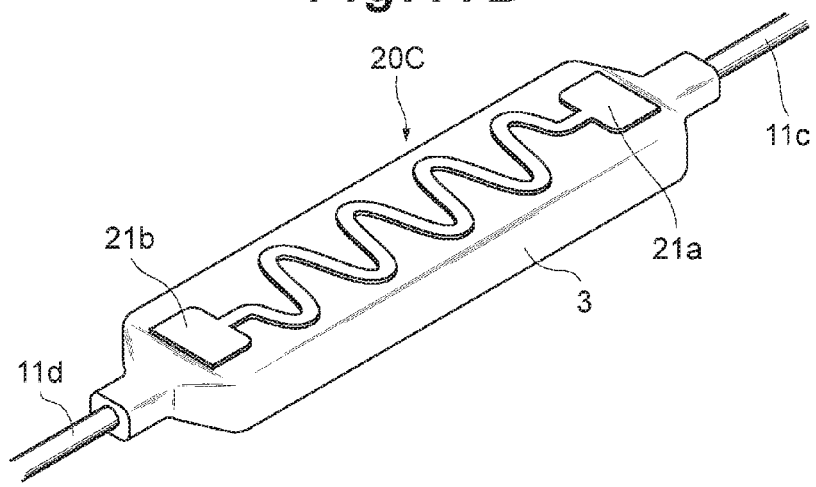
FIG. 11B schematically illustrates an oblique view of a cut-off device before wiring in the third embodiment.

Secondly, as shown in FIG. 11B, after the fuse circuit 10 is inserted and positioned such that the meltable part 12 of the fuse circuit 10 overlaps the heating part 22 of the heater circuit 20C, heat is applied to the insulation tube 3. The temperature of the heat can be controlled at or above the temperature at which the insulation tube 3 shrinks. By applying heat to the surface of the insulation tube 3, the insulation tube 3 shrinks and encapsulates the fuse circuit 10 entirely. It is possible to ship the cut-off device 100C without wiring the heat circuit 20C as performed in FIG. 11C. After shipment, a user can arbitrarily connect the power supply wiring to the heater circuit 20C when it becomes necessary.

Figure 11C:
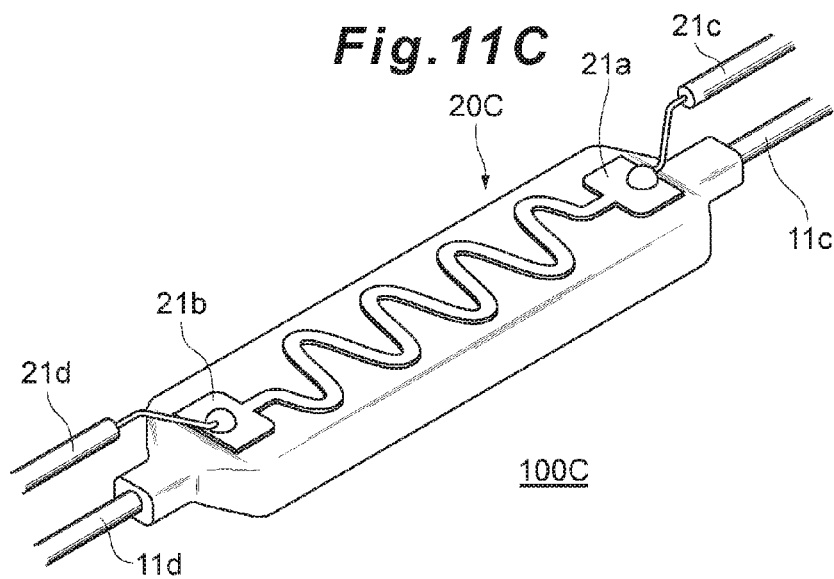
FIG. 11C schematically illustrates a completed oblique view of a cut-off device in the third embodiment.

Thirdly, as shown in FIG. 11C, after encapsulating the insulation tube 3, a first and second heater wirings 21c and 21d are soldered at the first and second heater circuit terminals 21a and 21b. For the afore-mentioned steps, the cut-off device 100C in the third embodiment is accomplished. It may be possible to cover the completed cut-off device 100C with a resin coating.

According to the third embodiment, as a commercially available tube can be used to manufacture the heater circuit 20C, it is possible to save on the cost of manufacturing it.

According to the third embodiment, if the cut-off device 100C is shipped without the heater circuit wiring, a user can connect the power supply wiring to the heater circuit 20C at a later time when it becomes necessary. Therefore, it is convenient for such a user who does not initially want the heater connection. For example, in a maintenance service for battery assemblies, when a battery assembly of the conventional type, which has no cut-off device, is carried in, a service person can attach a new cut-off device to the conventional battery assembly to provide with the benefit of the present technology.

A fourth embodiment will be explained hereinafter referring to FIGS. 12A to 12C. The fourth embodiment provides another alternative configuration of the cut-off device.

Figure 12A:
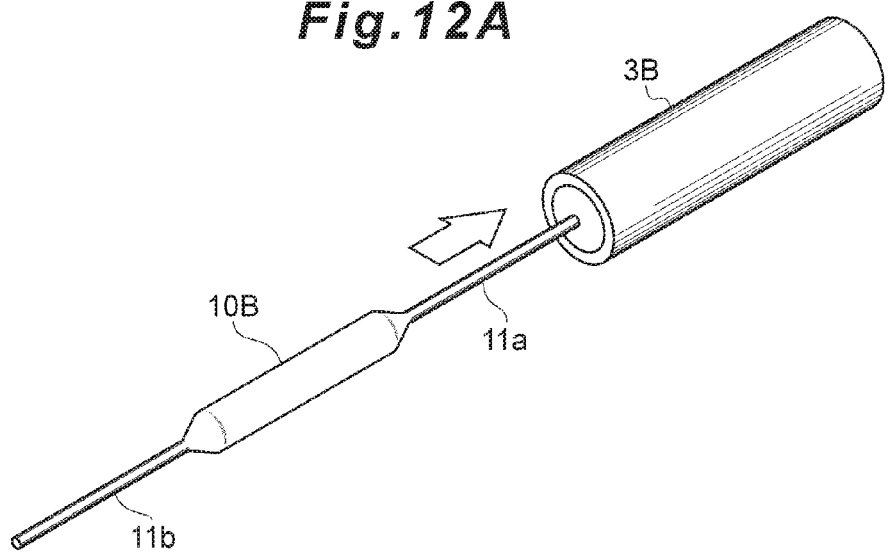
FIG. 12A schematically illustrates an oblique view of a circuit when covering it with an insulation tube in the fourth embodiment.

FIG. 12A schematically illustrates an oblique view of a fuse circuit 12B when covering it with an insulation tube 3B in the fourth embodiment. FIG. 12B schematically illustrates an oblique view of the fuse circuit 12B with the insulation tube 3B before forming a heater circuit 20D around the fuse circuit 12B in the fourth embodiment. FIG. 12C schematically illustrates a completed oblique view of a cut-off device 100D in the fourth embodiment.

In the fourth embodiment, a fuse circuit 10B having a configuration similar to a temperature fuse commercially available is employed. As shown in FIG. 12A, a temperature fuse is employed as the fuse circuit 10B in the fourth embodiment. With such a temperature fuse, any type of commercially available device configured to fuse at a certain melting point and disconnect its current flow can be employed. The temperature fuse is also called a "thermal cut-off."

Data sheets are usually available for such commercially available temperature fuses. In such data sheets, the specification of a series of the temperature fuses are indicated. For the specification to indicate the characteristic of the temperature fuse, there is usually some specified temperatures: for example, rated functioning temperature, functioning temperature, maximum operating temperature, holding temperature and maximum temperature limit. The "rated functioning temperature" is the temperature at which the fuse changes its state of conductivity to open circuit with loading detection current only. The "functioning temperature" is the fusing-off temperature at which the fuse changes its state of conductivity to open circuit in the ambient air oven which increases at a certain speed and with loading a certain amount of current. The "maximum operating temperature" is the maximum temperature at which the fuse can be maintained while conducting a certain rated current. The "holding temperature" is the maximum temperature at which the fuse can be maintained while conducting a certain rated current which will not cause a change in state of conductivity to open circuit. The "maximum temperature limit" is the maximum temperature at which the fuse can maintains its mechanical and electrical properties without closing again for a certain period after the fuse has changed its state of conductivity. The electrical rating is also defined in the data sheets.

One can arbitrarily choose an appropriate temperature fuse by referring to such data sheets, taking the maximum current flowing through the unit cell 101 and heat applied from the heater circuit into account. One example, but not limited to this, is thermal cutoffs N series, F series, E series, H series, MP series, and MU series (Panasonic Corporation) which can be used for the fuse circuit 10B.

In the fourth embodiment, an axial lead type thermal cut-offs N, F, E series is used for the fuse circuit 10B. Although not shown in the figures, the fuse circuit 10B comprises fusible alloy as the melting part and a pair of lead wires connected to end of the fusible alloy. The fusible alloy is encapsulated in an insulating case made of ceramic. The insulating case is sealed with a sealant of epoxy resin at both its ends and filled with a flux resin inside around fusible alloy.

First, as shown in FIG. 12A, the fuse circuit 10B is inserted into an insulation tube 3B. The configuration and material of the insulation tube 3B can be considered as being the same as the insulation tube 3 in the third embodiment. As well as the third embodiment, a resin tape or resin coating can be used for an alternative insulation means instead of the insulation tube 3B.

Figure 12B:
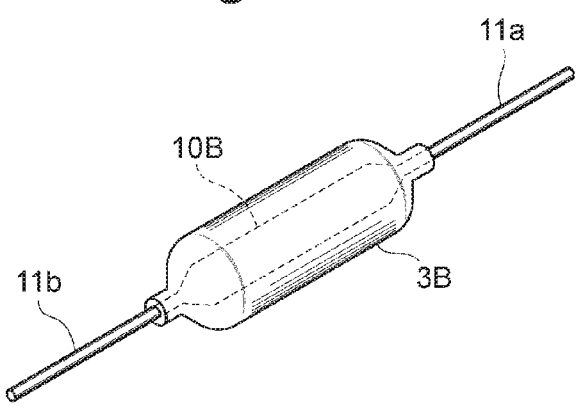
FIG. 12B schematically illustrates an oblique view of the fuse circuit with the insulation tube before forming a heater circuit around the fuse circuit in the fourth embodiment.

Secondly, as shown in FIG. 12B, after the fuse circuit 10B is inserted into the insulation tube 3B, heat is applied to the insulation tube 3B. Temperature of the heat can be controlled at or above the temperature at which the insulation tube 3B shrinks. By applying heat to the insulation tube 3, the insulation tube 3B shrinks and covers the fuse circuit 10B entirely.

Figure 12C:
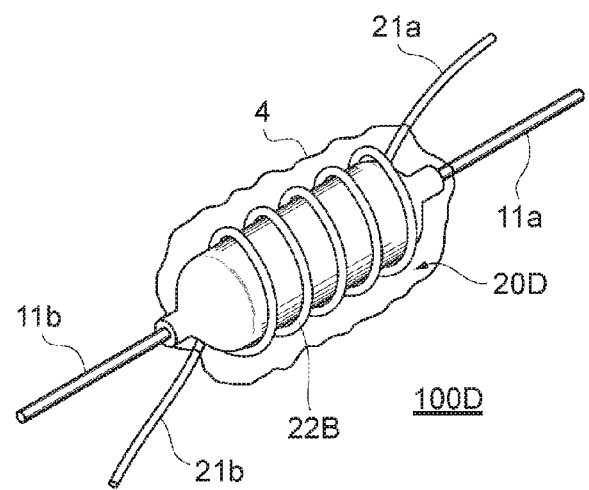
FIG. 12C schematically illustrates a completed oblique view of a cut-off device in the fourth embodiment.

Thirdly, as shown in FIG. 12C, after shrinking the insulation tube 3B, a heating wire 22B is wrapped around the shrunk insulation tube 3B. The heating wire 22B is a known heating wire such as nickel-chrome wire. The wrapped heating wire 22B constitutes the heating part. The first and second heater circuit wirings 21a and 21b are connected to the ends of the heating wire 22B.

Fourthly, a protective resin 4 is adhered around the insulation tube 3B so as to at least cover the wrapped heating wire 22B. A know resin or plastic can be used for the protective resin 4. For the afore-mentioned steps, the cut-off device 100D in the fourth embodiment is accomplished. It may be possible to accommodate the completed cut-off device 100D in a housing.

According to the fourth embodiment, commercially available parts are used for the fuse circuit 10B, the insulation tube 3B, and the heating wire 22B. Therefore, it is possible to further save on manufacturing costs.

The present embodiment as explained above has at least the following advantages. For example, according to the present embodiments, since the technologies used in the present embodiment are all existing and mature ones that do not require development of new technologies, implementation at a very low cost is possible.

According to the present embodiment, it is not necessary to mount any special component to cut the electrical connection between unit cells. It becomes possible to electrically separate the unit cells at the time of recovery or recycling just by applying an electric power to the heater circuit in the immediate vicinity of each fuse circuit.

According to the present embodiments, since the heater circuits are all connected in parallel, it is possible to electrically isolate all of the unit cells substantially at the same time by applying the electrical power to the heater circuits. Accordingly, safety for recovery and recycling the battery assembly is considerably improved.

The configuration of the battery assembly, the unit cell and the cut-off device is applicable to any type of power supply systems. It is expected that use of secondary batteries with high energy density and high capacity will increase explosively with advancements in smart grid projects, i.e. power grid systems incorporating sustainable power generation systems, such as solar battery system or wind power generation system.

In addition, with global spread of electric vehicles, it is believed that lithium-based secondary batteries are considered to be one of the most promising technologies. However it is expected that the amount of unit cells (battery packs) to be disposed of will also increase with maintenance, replacement purchases and the disposal of vehicles.

The battery packs include considerable amounts of materials that can be recycled with low energy such as copper and lithium, as well as precious metals that are currently being recovered such as cobalt. It is expected that recovery and recycling businesses for these materials will grow considerably worldwide as the battery sizes become larger and the number of batteries to be disposed of increases.

The configuration of the battery assembly, the unit cell and cut-off device can provide advantageous merits when disassembling the battery assembly stacking the secondary batteries.

EXAMPLES

Hereinafter, working examples of a cut-off device and a battery assembly are explained.

Example 1

Preparation of a Cut-off Device

Firstly, a thermal cut-off (EYP2MP092AFT, functioning Temperature of 88 degree Celsius, manufactured by Panasonic Corporation) was prepared. The thermal cut-off has a fusible alloy as a meltable part in a center resin package and a pair of terminals extending from the center resin package. Then, a polyimide film having a thickness of 0.5 mm was cut to sufficiently cover the full length and width of the thermal cut-off. Then, a carbon paste as a heating part was printed at the center area of a surface on one side of the trimmed polyimide film. The length and width of the carbon paste was adjusted to have an electric resistance of about 40 Ohm. Then, the thermal cut-off was attached by an appropriate adhesive to the opposite side of the polyimide film, so as to overlap the area of the printed carbon paste on one side with the center resin package on the opposite side of the polyimide film.

Example 2

Installation of a Cut-off Device

The manufactured cut-off device above was attached by an appropriate adhesive to one side of a lithium battery to form a lithium unit cell. One of two power terminals of the lithium battery is connected to the one of the terminals of the thermal cut-off. A total of twelve of the lithium batteries with the cut-off device were prepared. The lithium unit cells were assembled to form a battery bank. Wirings were arranged to connect the other of the two power terminals of the lithium battery to each other and to connect the other of the terminals of the thermal cut-off to each other. Both ends of the carbon paste of the cut-off devices were connected to each other to provide parallel connection. With the wirings above, a battery assembly having a total of 12 lithium unit cells with four columns and three rows was provided as shown in FIG. 1.

Example 3

Triggering of a Battery Cut-off Device for Recycling of Unit Cells

Two terminals which were connect to each of the carbon paste of the cut-off devices were then connected via a power switch to an extra battery having an electric power of 1.6 volts and 80 watts. Then, the power switch was turned on. At the moment of the turn-on, each of the fusible alloy of the thermal cut-off was melted within about 0.25 second. Each of the lithium battery units were able to be electrically isolated each other at a moment.

The invention claimed is:

1. A battery assembly, comprising:
a unit cell wiring configured to provide at least one connection;
a plurality of unit cells configured to be coupled by the at least one connection provided by the unit cell wiring, wherein each of the plurality of unit cells comprises:
a cut-off device configured to decouple an associated unit cell from the unit cell wiring, the cut-off device comprising:
a fuse circuit coupled in series with an associated unit cell body and comprising a meltable element, and
a heater circuit electrically isolated from the associated unit cell body and configured to produce heat in response to an applied electric power, the heater circuit positioned such that the produced heat melts the meltable element; and
a power supply wiring coupled to each heater circuit and configured to supply each heater circuit with the electric power.

2. The battery assembly of claim 1, further comprising a power supply configured to be coupled to the power supply wiring, the power supply configured to supply each heater circuit with the electric power via the power supply wiring.

3. The battery assembly of claim 1, wherein the at least one connection comprises at least one of a parallel connection and a series connection.

4. A unit cell, comprising:
a unit cell body configured to provide a first electric power; and
a cut-off device comprising:
a fuse circuit coupled in series with the unit cell body and comprising a meltable element, and
a heater circuit electrically isolated from the associated unit cell body and configured to produce heat in response to an applied second electric power, the heater circuit positioned such that the produced heat melts the meltable element.

5. The unit cell of claim 4, wherein the cut-off device is positioned at a first location where a local temperature of the unit cell body in use is expected to rise higher than a second location of the unit cell body.

6. The unit cell of claim 4, wherein the cut-off device is positioned at a location where a local temperature of the unit cell body in use is expected to rise the highest in the unit cell body.

7. A cut-off device, comprising:
a fuse circuit coupled to a unit cell body;
a heater circuit electrically isolated from the unit cell body and configured to produce heat; and
an insulator, wherein:
the fuse circuit is configured to be decoupled from the unit cell body by the heat produced in the heater circuit,
the fuse circuit includes a meltable part,
the heater circuit includes a heating part, the heating part being configured to produce the heat, wherein the heater circuit is positioned such that the produced heat melts the meltable element, and
the insulator is disposed at least between the meltable part and the heating part.

8. The cut-off device of claim 7, wherein the meltable part comprises a material having a melting point lower than a heat-resistant temperature of the insulator.

9. The cut-off device of claim 7, wherein the meltable part comprises a low-temperature solder material.

10. The cut-off device of claim 7, wherein the heating part comprises at least one of a wire and a paste.

11. The cut-off device of claim 7, wherein the heating part of the heater circuit comprises a material selected from a group comprised of carbon, silver, ferrum-chrome-aluminum alloy, nickel-chromium alloy, nickel-chrome-ferrum alloy, platinum, and ruthenium oxide.

12. The cut-off device of claim 7, wherein the insulator comprises heat conductive material.

13. The cut-off device of claim 7, wherein the insulator comprises polyimide.

14. The cut-off device of claim 7, wherein the insulator comprises a substrate.

15. The cut-off device of claim 7, wherein the insulator comprises a film.

16. The cut-off device of claim 7, wherein the insulator comprises a tube that is configured to surround the meltable part of the fuse circuit.

17. The cut-off device of claim 7, further comprising a protection layer positioned over at least the meltable part of the fuse circuit.

18. The cut-off device of claim 7, wherein the fuse circuit comprises a first fuse circuit terminal and a second fuse circuit terminal, and the heater circuit comprises a first heater circuit terminal and a second heater circuit terminal.

19. A method to decouple a plurality of unit cells from a battery assembly, the method comprising:
attaching at least one cut-off device to at least one of the plurality of unit cells, the cut-off device comprising:
a fuse circuit coupled in series with an associated unit cell body and comprising a meltable element, and
a heater circuit electrically isolated from the associated unit cell body and configured to produce heat in response to an applied electric power, the heater circuit positioned such that the produced heat melts the meltable element; and
supplying the heater circuit with the electric power to decouple the fuse circuit by the heat produced in the heater circuit, wherein supplying the heater circuit with the electric power is performed in response to the battery assembly being discarded.

20. A battery assembly, comprising:
a unit cell wiring configured to provide at least one connection;
a plurality of unit cells configured to be coupled by the at least one connection provided by the unit cell wiring, wherein each of the plurality of unit cells comprises:
an associated unit cell body, and
a cut-off device comprising:
a fuse circuit and a heater circuit, wherein the fuse circuit is configured to disable the at least one connection by heat produced in the heater circuit in response to an electrical power supplied to the heater circuit, and an insulator comprising at least one of:
- a tube that is configured to surround a meltable element of the fuse circuit, and
- a protection layer positioned over at least a meltable element of the fuse circuit, wherein the cut-off device is positioned where a local temperature of the associated unit cell body is expected to rise higher than a second location of the associated unit cell body; and a power supply wiring coupled to each heater circuit and configured to supply each heater circuit with the electric power in response to the battery assembly being disassembled and sicarded.

* * * * *